United States Patent [19]

Rodman et al.

[11] 4,361,933

[45] Dec. 7, 1982

[54] METHOD OF SHUCKING SCALLOPS AND AN APPARATUS THEREFOR

[75] Inventors: William K. Rodman, Bedford; Peter de St. Denys Prevost, Waverley, both of Canada

[73] Assignee: Canadian Patents & Development Limited, Ottawa, Canada

[21] Appl. No.: 262,628

[22] Filed: May 11, 1981

[51] Int. Cl.³ .............................................. A22C 29/04
[52] U.S. Cl. ............................................... 17/48; 17/51; 17/74
[58] Field of Search ........................... 17/74, 48, 51, 52

[56] References Cited

U.S. PATENT DOCUMENTS 3,594,860 7/1971 Nelson et al. ...................... 17/74 X
3,605,180 9/1971 Harris et al. ........................... 17/74
3,629,904 12/1971 Zober ................................. 17/48 X
3,696,465 10/1972 Rossnan ................................. 17/48

*Primary Examiner*—Willie G. Abercrombie
*Attorney, Agent, or Firm*—Francis W. Lemon

[57] ABSTRACT

Scallops are shucked by being placed on scallop cradles moving along an endless flexible member and a hinged portion of the scallop shell and an opposed portion thereto are sawn from the remainder, to expose the interior, while the scallops are held in the cradles by an endless flexible member. The sawn scallops are then held in the cradles by clamping fingers engaging the bottom shells so that when the shells are inverted a high pressure water jet severs the muscle allowing what was the top shell to fall away, then a series of low pressure water jets detach the viscera and roe, followed by a high pressure fan jet which detaches the muscle.

10 Claims, 4 Drawing Figures

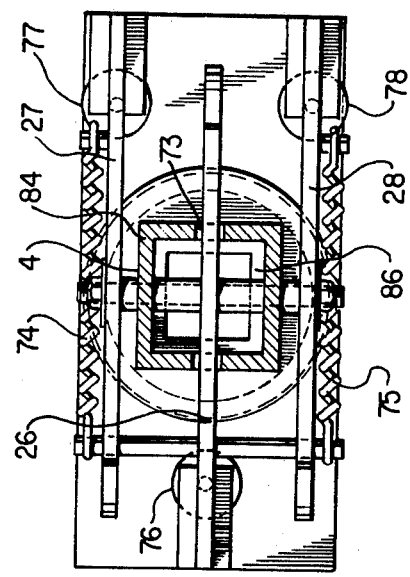
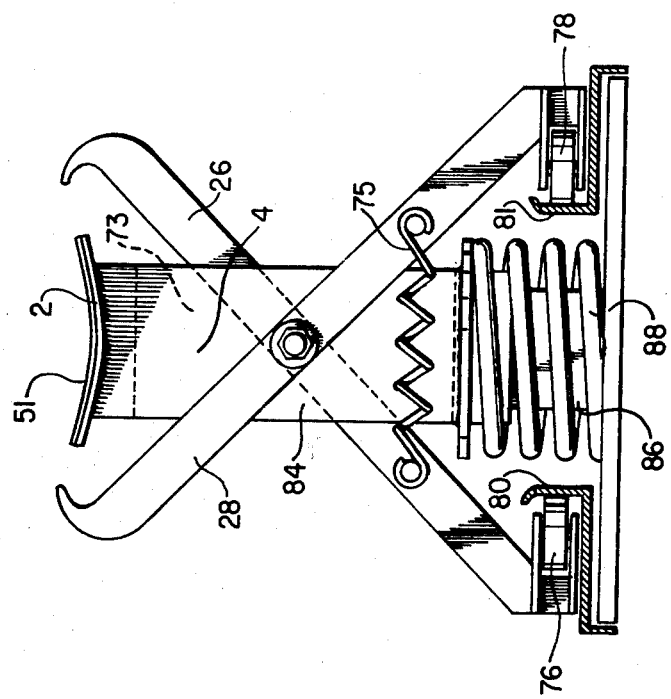

METHOD OF SHUCKING SCALLOPS AND AN APPARATUS THEREFOR

This invention relates to a method of shucking scallops and an apparatus therefor.

U.S. Pat. No. 3,594,860 (Nelson et al), dated July 27, 1971, discloses a method of mechanically shucking and eviscerating bivalve mollusks, particularly scallops, in a continuous process. A burner severs one half-shell from the bivalve muscle, gaping the shell. The two half-shells are then physically separated and the remaining half-shell, with the muscle and viscera attached, is inverted in a water bath. Water jets strike the flesh, loosening the viscera from the muscle and the shell. A suction pump ingests the viscera in a steadily flowing stream of water, thoroughly eviscerating the bivalve. Another burner then severs the muscle from the remaining half-shell.

While the process of Nelson et al is a useful contribution to the art, the burners partially cook the meat before the muscle is separated from the shell.

There is a need for a method and apparatus for shucking scallops wherein the scallops are shucked while alive and before sand becomes entrapped when the muscle goes into rigor mortis.

According to the present invention there is provided a method of shucking scallops, comprising:

(a) placing unshucked scallops on scallop cradles distributed along the length of, and attached to, a moving endless flexible member, with the hinged portion of the shell of each of the scallops overhanging one side of the cradle on which it is placed and an edge portion of the shell, opposing the hinged portion, overhanging the other side of that cradle, (b) clamping a central portion of each unshucked scallop while that scallop passes a saw cutting position, (c) making two parallel saw cuts to each of the clamped, unshucked scallops to cut and remove the overhanging portions thereof from the remainder and expose the shell interior, then (d) clamping, by fingers entering the exposed shell interior, only the bottom, sawn shell of each scallop to the cradle it is on prior to and while that scallop is inverted, with muscle thereon, on a second side of the loop of the endless flexible member, then, (e) directing a high pressure, pencil, water jet into the shell interior, and towards what was the hinged side of the scallop, to sever muscle of that scallop from the unclamped, scallop top shell and allow the unclamped, scallop top shell thus detached to fall away and expose the eviscera and roe, then (f) directing a series of low pressure fan jets of water at the viscera and roe to detach and remove the viscera and roe and expose the muscle, then (g) directing a high pressure fan jet of water at the clamped shell, which substantially conforms to the interior curvature of the shell, to sever and remove the exposed muscle from the shell, then (h) unclamping the bottom, sawn shell of the scallop from the cradle to which it was clamped to allow that bottom, sawn shell to fall away from that cradle.

In some embodiments of the present invention the scallops are conveyed by the scallop cradles on the endless flexible member passed two, rotating, circular saw blades comprising the two parallel saw blades.

In other embodiments of the present invention the central portion of each unshucked scallop is clamped to the cradle therefor by means of an endless flexible member resiliently urged against the scallops and comprising the clamping means.

In yet other embodiments of the present invention the unshucked scallops are placed on a concave surface of the cradles provided with a soft, skid-proof coating.

Further, according to the present invention there is provided a scallop shucking apparatus, comprising:

(a) an endless flexible member, (b) scallop cradles distributed along the length of the endless flexible member, and attached thereto, for each receiving an unshucked scallop thereon with a hinged portion of the shell thereof overhanging one side of the cradle on which it is placed and an edge portion of the shell, opposing the hinged portion, overhanging the other side of that cradle, (c) mounting means around which the endless flexible member is looped so that each of the cradles on a first, side of the loop faces upwardly for receiving the scallop thereon, (d) driving means for driving the endless flexible member around the mounting means, (e) clamping means for clamping a central portion of each unshucked scallop to the cradle therefor only while that scallop passes a saw cutting position, (f) two drivable parallel, saw blades at the scallop cutting position for cutting and removing the overhanging portions of each scallop shell from the remainder and exposing the shell interior, (g) clamping fingers for entering opposite sides of the scallop and clamping only the bottom, sawn shell of each scallop to the cradle it is on prior to and while that scallop is inverted on a second side of the loop of the endless flexible member, and, in the direction for movement of the endless flexible member, (h) a water jet nozzle for connection to a source of high pressure water for directing a pencil jet of high pressure water into the shell interior, and towards what was the hinged side of the scallop, to sever muscle of that scallop from the unclamped, scallop top shell and allow the unclamped, scallop top shell thus detached to fall away and expose the viscera and roe, followed by (i) a series of low pressure fan jets nozzles for connection to a source of low pressure water for directing a series of low pressure fan jets for detaching and removing the viscera and roe, and exposing the muscle and then (j) a high pressure fan jet nozzle for connection to a high pressure water source for directing a high pressure fan jet which substantially conforms to the interior curvature of the shell for severing and removing the exposed muscle from the shell.

In the accompanying drawings which illustrate, by way of example, an embodiment of the present invention:

FIG. 3 is an enlarged end view of a scallop cradle and a clamping means shown in FIG. 2, and FIG. 4 is a plan view of the clamping means shown in FIG. 3 with the scallop cradle removed.

Figure 1:
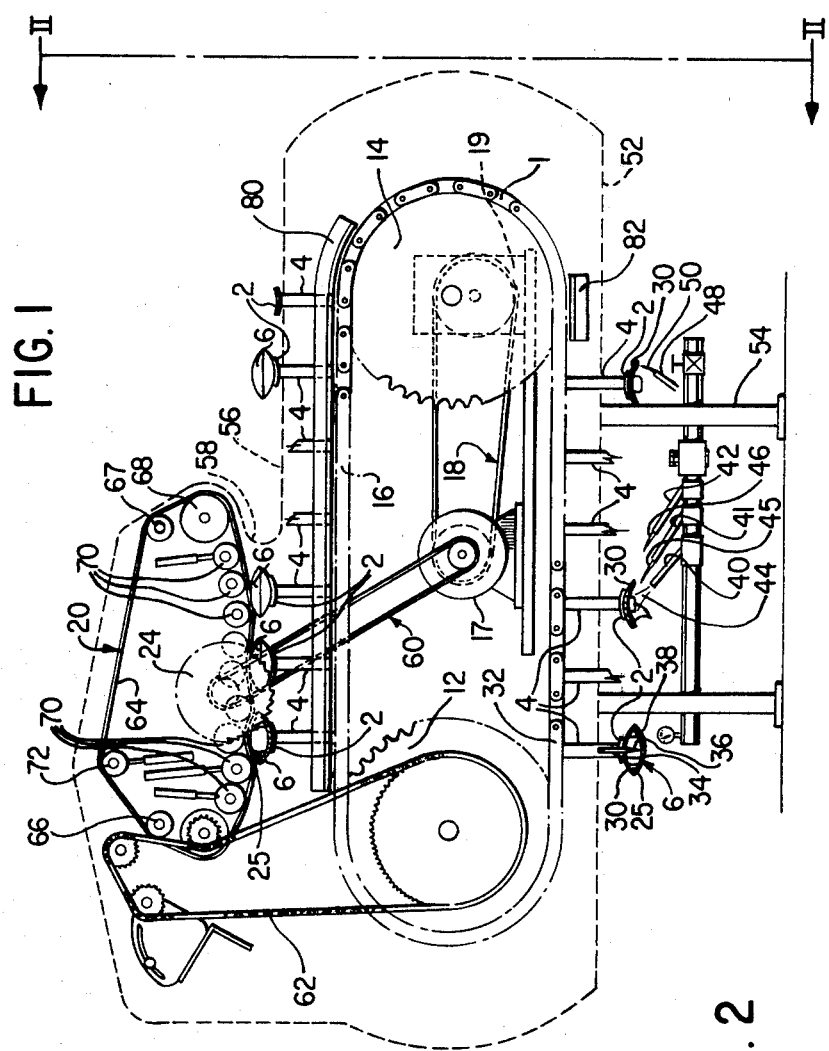
FIG. 1 is a diagrammatic side view of a scallop shucking apparatus.
Figure 2:
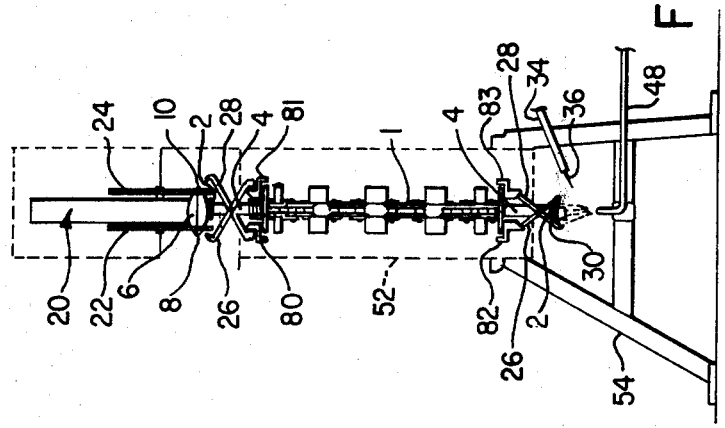
FIG. 2 is a diagrammatic end view along II—II, FIG. 1, with an end portion of a cam track removed to expose an endless conveyor and the drive removed.

Referring now to FIGS. 1 to 4 there is shown a scallop shucking apparatus, comprising:

(a) an endless flexible in the form of an endless chain 1, (b) twenty-nine scallop cradles, some of which are shown and designated 2, distributed along the length of the endless chain 1, and attached thereto by supports, some of which are shown and designated 4, for each receiving an unshucked scallop, such as scallops designated 6, thereon with a hinged portion designated 8 (FIG. 2) of the shell thereof overhanging one side of the cradle 2 on which it is placed and an edge portion of the shell designated 10 (FIG. 2), opposing the hinged portion, overhanging the other side of that cradle 2, (c) mounting means, in the form of sprockets 12 and 14, around which the endless chain 1 is looped so that each of the cradles 2 on a first side 16 (FIG. 1) of the loop faces upwardly for receiving the scallop such as 6 thereon, (d) driving means, in the form of an electric motor 17, belt drive 18 and reduction gear 19 for driving the endless chain 1 around the sprockets 12 and 14, (e) clamping means, generally designated 20, for clamping a central portion of each unshucked scallop, such as 6, to the cradle 2 therefor only while that scallop, such as 6, passes a saw cutting position, (f) two drivable parallel, saw blades 22, 24 (FIG. 2) at the scallop cutting position for cutting and removing the overhanging portions of each scallop shell from the remainder and exposing the shell interior 25, (g) clamping fingers 26 to 28 (FIGS. 2 to 4) for entering opposite sides of the scallop, such as 6, and for clamping only the bottom, sawn shell, such as 30, of each scallop, such as 6, to the cradle 2 it is on prior to and while that scallop 6 is inverted on a second side 32 of the loop of the endless flexible member 1, and in the direction for movement of the endless flexible member 1, (h) a water jet nozzle 34 for connection to a source of high pressure water for directing a pencil jet 36 of high pressure water into the shell interior 25, and towards what was the hinged side 8 of the scallop 6 to sever muscle of that scallop 6 from the unclamped, scallop top shell 38 and allow the unclamped, scallop top shell 38 thus detached to fall away and expose the viscera and roe, followed by (i) a series of three low pressure fan jet nozzles 40 to 42 for connection to a source of low pressure water (not shown) for directing a series of low pressure fan jets 44 to 46 for detaching and removing the viscera and roe, and exposing the muscle and then (j) a high pressure fan jet nozzle 48 for connection to a high pressure water source (not shown) for directing a high pressure fan jet 50 which substantially conforms to the interior curvature of the shell 30 for severing and removing the exposed muscle from the shell, such as 30.

The concave surfaces of the cradle 2 are coated with a liquid, rubber-like material sold under the trade name Stretch-Tex by Coverall Rubber Products Limited, Halifax, Nova Scotia, Canada, to provide a soft, skid-proof coating 51 (FIG. 3) for the scallop 6.

The sprockets 12 and 14 are rotatably mounted in a casing 52 (shown dashed) on a stand 54. The casing 52 is open along the upper portion 56 and around the inwardly curving portion 58 in order to expose the cradle 2 for scallops to be placed on them.

The electric motor 17 is mounted on the casing 52 and is coupled to the saw blades 22 and 24 by means of a belt drive 60. A chain and sprocket drive 62 couples the sprocket 12 to the clamping means 20 so that the clamping means 20 is driven at substantially the same speed as the endless chain 1.

The clamping means 20 comprises a movable endless, flexible belt 64 passing round a series of guide wheels 66 to 68 and resiliently urged against the scallops 6 by spring, hydraulic or pneumatic loaded guide wheels 70 and held tensioned by a further spring, hydraulic or pneumatic loaded guide wheel 72.

The two parallel, circular saw blades 22, 24 are rotatably mounted in the casing 52 and are driven by the belt drive 60 from the electric motor 17.

The clamping fingers 26 to 28, which are shown in detail in FIGS. 3 and 4 are pivotally mounted in a scissor-like manner on one of the supports 4 with the clamping finger 26 in a slot 73 in the support 4 and between the clamping fingers 27 and 28. The clamping finger 26 is attached to the clamping fingers 27 and 28 by tension springs 74 and 75 so that the clamping finger 26 grips one sawn side of a bottom, sawn shell, such as 6 while the clamping fingers 27 and 28 grip the other sawn side of that bottom, sawn shell. The clamping fingers 26 to 28 are provided with cam follower rollers 76 to 78 respectively which runs along cam tracks 80, 81 and 82, 83 attached to the casing 52. The cam follower rollers 76 to 78 and the cam tracks 80 and 81 hold the fingers 26 to 28 open against the tension springs 74 and 75 when a scallop 6 is to be placed on a cradle 2 and while the saw blades 22, 24 are cutting a scallop. These cam tracks 80 and 81 terminate after the saw cutting position so that the fingers 26 to 28 grip at the bottom sawn shell, such as 30, immediately following the sawing scallop, such as 6, by the saw blades 22, 24 and until the high pressure fan jet 50 has severed and removed the muscle from the shells, such as 30. After the muscle has been severed and removed from the shells, such as 30, the cam track follower rollers 76 to 78 run along the cam tracks 82 and 83 which hold the fingers 26 to 28 open against the tension springs 74 and 75 to allow each empty shell to fall away from the cradle 2 to which it has been clamped. As is also shown in FIGS. 3 and 4 the supports 4 each comprise two telescoping portions 84 and 86 which have limited movement in extending telescopically and which are urged in this direction by compression springs 88.

In operation, with the clamping fingers 26 to 28 held apart by the cam tracks 80 and 81, scallops such as 6 are placed on each of the scallop cradles 2, on the moving endless chain 1, with their hinged portions 8 overhanging one side of a cradle 2 on which they are placed and an edge portion 10, opposing the hinged portion 8, overhanging the other side of a cradle 2.

The endless chain 1 conveys the scallops such as 6 to the clamping means 20 so that the endless, flexible belt 64 clamps each scallop such as 6 to its cradle 2 while the saw blades 22, 24 make two parallel saw cuts to each of the clamped, unshucked scallopes to cut and remove the overhanging portions 8 and 10 thereof from the remainder and expose the shell interior 25. The compression springs 88 also assist in clamping the scallops for this purpose.

The bottom, sawn shell, such as 30, of each scallop is then clamped to the cradle 2 by the clamping fingers 26 to 28. This is effected by the cam follower rollers 76 to 78 running off the ends of the cam tracks 80 and 81 so that the tension springs 74 and 75 are allowed to pull the clamping fingers 26 on the one hand and the clamping fingers 27 and 28 on the other hand towards each other.

The scallops, each clamped to a cradle 2, are then conveyed by the endless flexible chain 64 round the sprocket 12 and passed the water jet nozzle 34, the fan jet nozzles 40 to 42, and the high pressure fan jet nozzle 48, where the unclamped, scallop top shell is first removed, followed by the viscera and roe, and then the muscle. The cam follower rollers 76 to 78 then engage the cam tracks 82 and 83 to open the fingers 26 to 28 and allow the bottom, sawn shell to fall away from the cradle 2 to which it was clamped. Each cradle 2 is then conveyed around the sprocket 12 to the cam tracks 80 and 81 where a further scallop to be placed upon it.

A suitable water pressure for the water to the nozzle 34 has been found to be one which is not least of the order of 1100 psi (77.34 K/cm$^2$).

A suitable water pressure for the water to the fan jet nozzles 40, 42 has been found to be of the order of, 60 to of the order of 80 psi (4.21 to 5.62 K/cm$^2$) with the fan jets inclined about 45° in both the horizontal and vertical planes to peel back the viscera from the muscle. The fan jet nozzles 40 to 42 were all Veejet (Trademark) nozzles obtainable from Spray System Company, Wheaton, Ill., U.S.A.

A suitable water pressure for the water to the high pressure fan jet nozzle 48 has been found to be of the order of 1100 psi (77.34 K/cm$^2$) with the jet inclining upwardly the direction of flow of the jet at about 30° to the horizontal. The high pressure fan jet nozzle 48 was a Flatjet (Trademark) nozzle obtained from Spray System Company, Wheaton, Ill., U.S.A.

The present invention leaves the roe undamaged which can also be separated from the viscera and sold as an edible product. With other machines the roe is squashed beyond recognition.

With the present invention the quality of the removed muscle is greatly improved in comparison with that removed by other machines because the scallops were shucked while they are alive and before sand becomes entrapped with muscle by the scallop dying (rigor mortis).

While the present invention was primarily developed for shucking Icelandic scallops, which have a closed shell, it is also useful for shucking the more abundant sea scallops.

In different embodiments of the present invention a hydraulic drive is used instead of the electric motor 18.

We claim:

1. A method of shucking scallops, comprising:
   (a) placing unshucked scallops on scallop cradles distributed along the length of, and attached to a moving, endless flexible member, with the hinged portion of the shell of each of the scallops overhanging one side of the cradle on which it is placed and an edge portion of the shell, opposing the hinged portion, overhanging the other side of that cradle,
   (b) clamping a central portion of each unshucked scallop while that scallop passes a saw cutting position,
   (c) making two parallel saw cuts to each of the clamped, unshucked scallops to cut and remove the overhanging portion thereof from the remainder and expose the shell interior, then
   (d) clamping, by fingers entering the exposed shell interior, only the bottom, sawn shell of each scallop to the cradle it is on prior to and while that scallop is inverted, with muscle thereon, on a second side of the loop of the endless flexible member, then
   (e) directing a high pressure, pencil, water jet into the shell interior, and towards what was the hinged side of the scallop, to sever muscle of that scallop from the unclamped, scallop top shell and allow the unclamped, scallop top shell thus detached to fall away and expose the viscera and roe, then
   (f) directing a series of low pressure fan jets of water at the viscera and roe to detach and remove the viscera and roe and expose the muscle, then
   (g) directing a high pressure fan jet of water which substantially conforms to the interior curvature of the shell, to sever and remove the exposed muscle from the shell, then
   (h) unclamping the bottom, sawn shell of the scallop from the cradle to which it was clamped to allow that bottom, sawn shell to fall away from that cradle.

2. A method according to claim 1, wherein the scallops are conveyed by the scallop cradles on the endless flexible member passed two, rotating, circular saw blades comprising the two parallel, saw blades.

3. A method according to claim 1, wherein the central portion of each unshucked scallop is clamped to the cradle therefor by means of a moving, endless, flexible member resiliently urged against the central portion of the scallops and comprising the clamping means.

4. A method according to claim 1, wherein the unshucked scallops are placed on a concave surface of the cradles provided with a soft, skid-proof coating.

5. A method according to claim 1, wherein the bottom, sawn shell of each scallop is clamped to the cradle it is on by two outer fingers on what was the hinged side, and one central finger on the other side.

6. A scallop shucking apparatus, comprising:
   (a) an endless flexible member,
   (b) scallop cradles distributed along the length of the endless flexible member, and attached thereto, for each receiving an unshucked scallop thereon with a hinged portion of the shell thereof overhanging one side of the cradle on which it is placed and an edge portion of the shell, opposing the hinged portion, overhanging the other side of that cradle,
   (c) mounting means around which the endless flexible member is looped so that each of the cradles on a first side of the loop faces upwardly for receiving the scallop thereon,
   (d) driving means for driving the endless flexible member around the mounting means,
   (e) clamping means for clamping a central portion of each unshucked scallop to the cradle therefor only while that scallop passes a saw cutting position,
   (f) two drivable parallel, saw blades at the scallop cutting position for cutting and removing the overhanging portions of each scallop shell from the remainder and exposing the shell interior,
   (g) clamping fingers for entering opposite sides of the scallop and clamping only the bottom, sawn shell of each scallop to the cradle it is on prior to and while that scallop is inverted on a second side of the loop of the endless flexible member, and, in the direction for movement of the endless flexible member,
   (h) a water jet nozzle for connection to a source of high pressure water for directing a pencil jet of high pressure water into the shell interior, and towards what was the hinged side of the scallop, to sever muscle of that scallop from the unclamped, scallop top shell and allow the unclamped, scallop top shell thus detached to fall away and expose the viscera and roe, followed by (i) a series of low pressure fan jet nozzles for connection to a source of low pressure water for directing a series of low pressure fan jets for detaching and removing the viscera and row and exposing the muscle and then (j) a high pressure fan jet nozzle for connection to a high pressure water source for directing a high pressure fan jet which substantially conforms to the interior curvature of the shell for severing and removing the exposed muscle from the shell.

7. Apparatus according to claim 6, wherein the two, parallel saw blades comprise circular saw blades.

8. Apparatus according to claim 6, wherein the clamping means comprises a movable, endless flexible member and means for resiliently urging the endless flexible member against central portion of the scallops.

9. Apparatus according to claim 7, further comprising a chain and sprocket drive coupling the endless flexible member of the clamping means to the driving means to be driven thereby at substantially the same speed as the endless flexible member around the mounting means.

10. Apparatus according to claim 6, wherein the said clamping fingers comprise two outer fingers for clamping each bottom, sawn shell of each scallop on what was the hinged side and one central finger for clamping each bottom, sawn shell on the other side.

* * * * *